United States Patent [19]

Kotchick et al.

[11] Patent Number: 4,913,982
[45] Date of Patent: Apr. 3, 1990

[54] FABRICATION OF A MONOLITHIC SOLID OXIDE FUEL CELL

[75] Inventors: David M. Kotchick, San Pedro; Nguyen Q. Minh, Fountain Valley, both of Calif.

[73] Assignee: Allied-Signal Inc., Morris Township, Morris County, N.J.

[21] Appl. No.: 259,672

[22] Filed: Oct. 19, 1988

Related U.S. Application Data

[63] Continuation-in-part of Ser. No. 941,492, Dec. 15, 1986, Pat. No. 4,816,036.

[51] Int. Cl.⁴ .................... H01M 8/12; H01M 8/24
[52] U.S. Cl. .................... 429/12; 29/623.3; 429/30; 427/115
[58] Field of Search ........... 429/12, 39, 38, 30; 29/623.1, 623.3; 427/115

[56] References Cited

U.S. PATENT DOCUMENTS

| | | | |
|---|---|---|---|
| 4,476,196 | 10/1984 | Poeppel et al. | 429/32 |
| 4,476,198 | 10/1984 | Ackerman et al. | 429/32 |
| 4,579,789 | 4/1986 | Fukuda et al. | 429/39 |
| 4,580,337 | 4/1986 | Shigeta et al. | 29/623.1 |
| 4,664,988 | 5/1987 | Shigeta et al. | 429/39 |
| 4,749,632 | 6/1988 | Flandermeyer et al. | 429/12 |
| 4,799,936 | 1/1989 | Riley | 429/30 |

Primary Examiner—Donald L. Walton
Attorney, Agent, or Firm—David B. Abel; James W. McFarland

[57] ABSTRACT

A monolithic solid oxide fuel cell of the type characterized by a plurality of fuel and oxidant passageways extending through the core of the fuel cell. The fuel cell is constructed only of anode, cathode, electrolyte and interconnect materials. The cell is constructed using multilayer tapes formed by first roll milling four individual tapes of cathode, electrolyte, anode, and interconnect material, and then roll milling the multilayer tape from the four tapes of a single material. Passageways are formed within the cathode and anode layers by roll milling elongated organic fibers into the tapes and burning out the fibers during the binder removal, sintering process. A manufacturing process is also disclosed.

24 Claims, 3 Drawing Sheets

FABRICATION OF A MONOLITHIC SOLID OXIDE FUEL CELL

BACKGROUND OF THE INVENTION

This application is a continuation-in-part application of U.S. Ser. No. 941,492 filed Dec. 15, 1986 issued as U.S. Pat. No. 4,816,036 on Mar. 28, 1989.

This invention relates to solid oxide fuel cells and more particularly o a method of fabricating the fuel cell core.

A fuel cell is basically a galvanic conversion device that electrochemically reacts hydrogen or a hydrocarbon fuel and an oxidant within catalytic confines to produce a DC electrical output. In a fuel cell, cathode material defines the passageways for the oxidant and anode material defines the passageways for the fuel, and an electrolyte separates the cathode and anode materials. The fuel and oxidant fluids, typically as gases, are continuously passed through the cell passageways separated from one another. The fuel and oxidant discharges from the fuel cell generally remove the reaction products and heat generated in the cell. The fuel and oxidant are the working fluids and as such are typically not considered an integral part of the fuel cell itself.

The type of fuel cell for which this invention has direct applicability is known as the solid electrolyte or solid oxide fuel cell, where the electrolyte is in solid form in the fuel cell. In the solid oxide fuel cell, hydrogen or a hydrocarbon is used as the fuel and oxygen or air is used as the oxidant, and the operating temperature of the fuel cell is between 700° and 1,100° C.

The hydrogen passing through the fuel cell reacts with oxide ions on the anode to yield water which is carried off in the fuel flow stream, with the release of electrons into the anode material. The oxygen reacts with the electrons on the cathode surface to form the oxide ions which then pass into the electrolyte material. Electrons flow from the anode through an appropriate external load to the cathode, and the circuit is closed internally by the transport of oxide ions through the electrolyte. The electrolyte insulates the cathode and anode from one another with respect to electron flow, but permits oxygen ions to flow from the cathode to the anode. Thus, the reactions are, at the:

| cathode | $\frac{1}{2} O_2 + 2e^- \rightarrow O^{-2}$ |
| anode | $H_2 + O^{-2} \rightarrow H_2O + 2e^-$. |

The overall cell reaction is $H_2 + \frac{1}{2}O_2 \rightarrow H_2O$.

In addition to hydrogen, the fuel can be derived from a hydrocarbon such as methane ($CH_4$) reformed by exposure to steam at 390° C. or above, which initially produces one molecule of carbon monoxide (CO) and three molecules of hydrogen. As hydrogen is consumed, a shift in reaction occurs to $CO + H_2O \rightarrow CO_2 + H_2$.

The overall reaction of hydrocarbons in the cell is illustrated by $CH_4 + 2O_2 \rightarrow CO_2 + 2H_2O$.

Inasmuch as the conversion within the fuel cell is electrochemical, the thermal limitations of the Carnot cycle are circumvented. Therefore, efficiencies exceeding 50% fuel heat energy conversion to electrical output can be obtained. This is much higher than equivalent thermal engines utilizing the same fuel conversion, including even a conventional diesel powered engine.

The electrolyte isolates the fuel and oxidant gases from one another while providing a medium allowing oxygen ion transfer, as well as voltage buildup on opposite sides of the electrolyte. The electrodes (cathode and anode) provide paths for the internal movement of electrical current within the fuel cell to the cell terminals, which also connect with an external load. The operating voltage across each cell is on the order of 0.7 volts so the individual cells must be placed in electrical series to obtain a useful load voltage. Diffusion of the working gases (hydrogen or oxygen) through the electrodes to the electrolyte also limits the cell performance. However, fuel and oxidant must diffuse away from the flow stream in the respective passageways through the electrode to the reaction sites. The fuel and oxidant diffuse through the electrodes to the electrolyte and react at or near the three-phase boundary of the gases, the electrodes (anode or cathode), and electrolyte, whereat electrochemical conversion occurs.

While it is possible to thermally and electrically extract great quantities of energy from the fuel, it is also inherently inefficient to extract such energies to the complete depletion of the fuel and oxidant. As the hydrogen partial pressure of the fuel gases decreases along the length of the fuel passageways, less voltage is generated near or at the downstream end of the fuel passageways. Complete conversion of the fuel in the fuel cell is thus not sought as it is intrinsically inefficient in the overall output of the cell voltage. For both a single cell and cells in gas flow series, the maximum theoretical voltage decreases along the length of the cell. Practical fuel cells may therefore consume up to 90% of the fuel because the cell voltage decreases rapidly as the hydrogen becomes less than 5% of the fuel gas. The reduction in maximum cell voltage as the fuel is consumed is an important limitation.

Past fuel cell designs have centered on a series of solid oxide fuel cells utilizing a ceramic support tube, and the electrodes and electrolyte built up as layers on the support tube. The support tube is confined in a sealed housing, and the fuel and oxidant are manifolded to the housing and the reaction products are ported from the housing as required. Depending on the layer build-up, the fuel is either conveyed internally of the support tube and the oxidant is conveyed externally of the support tube (or vice versa). A practical fuel cell unit would be composed of many such tubes supported within an exterior housing, and manifolding would separate and direct the fuel and oxidant proximate the tubes.

A typical support tube might be formed of calcia-stabilized zirconia ($ZrO_2 + CaO$); the cathode typically would be applied to the exterior face of the support tube and might be in the form of lanthanum manganite ($LaMnO_3$); the electrolyte would be layered over a portion of the cathode, comprised, for example, of yttria-stabilized zirconia ($ZrO_2 + Y_2O_3$); and the anode would be layered over the electrolyte comprised, for example, of a nickel yttria-stabilized zirconia cermet or mixture ($N_i + ZrO_2 + Y_2O_3$). The oxidant would thereby flow internally of the structural tube while fuel will be circulated externally of the tube. For part of the cell where a series connection is to be made with an adjacent cell, the interconnection would be layered over the cathode at this location instead of the electrolyte and anode, to engage the anode of the adjacent cell. The interconnect might be comprised, for example, of lanthanum chromite ($LaCrO_3$).

To form this type of fuel cell, the support tube must be formed with a high degree of porosity. Even with 40% porosity, the support tube represents a large diffusion barrier. The diffusion losses increase very steeply at high current densities and represent a limit on current and hence power. The minimum size of the support tube has been about 1 cm in diameter, with a side wall about 1 mm thick. A limiting factor of this support tube core arrangement is the length of path that the current must pass along the cathode and anode materials thereby inducing significant electrical resistance losses. In one effort to minimize this, the respective tubes have been shortened lengthwise and stacked end-to-end on one another, and the anodes and cathodes of the successive respective tubes have been interconnected in a serial fashion with an interconnect. This renders a single tube through which the fuel and/or oxidant passes, while the serial connection produces a higher voltage cumulative of the total number of serially interconnected individual tubes. The current flow is in line with the direction of the fuel and/or oxidant flow, namely axially of the tube configuration.

Moreover, the tube supports are nonproductive and heavy so that the power and energy densities suffer when compared to other forms of energy conversion, including even the liquid electrolyte fuel cells more commonly operated at lower temperatures.

In contrast to the tubular type fuel cells of the prior art, the cellular type fuel cell cores (see U.S. Pat. No. 4,476,198) of the prior art are made by the process whereby the compositions used for the four materials are put into four distinct slurries. Each slurry is then placed in a reservoir of a squeegee-type device which is pulled over a flat surface and hardens or plasticizes into a layer of the material having the desired thickness. In this manner the electrolyte wall or interconnect wall is formed by a first layer of anode material followed by a layer of either electrode or interconnect material and finally by a layer of the cathode material. The layers are bonded together since the binder system is the same in each layer.

U.S. Pat. No. 4,476,198 (Ackerman, et al) discloses a monolithically formed core consisting only of materials active in the electrochemical reactions. This means that the electrolyte and interconnect walls of the core would be formed respectively, only of anode and cathode materials layered on the opposite sides of electrolyte material, or on the opposite sides of interconnect material. This allows the use of very thin material layers and very thin resulting composite core walls. Each layer of anode and cathode is deposited on the electrolyte or interconnect material using a stencil or template device. The thin composite core walls can be shaped to define small passageways, while yet having sufficient structural integrity to withstand the fluid pressures generated by gas flow through the passageways and the mechanical stresses due to the weight of the stacked core walls on one another. This beneficially increases the power density of the fuel cell because of its reduced size and weight.

U.S. Pat. No. 4,476,196 (Poeppel, et al) discloses a monolithic core construction having the flow passageways for the fuel and for the oxidant gases extended transverse to one another, whereby full face core manifolding can be achieved for these gases and their reaction products. The core construction provides that only anode material surround each fuel passageway and only cathode material surround each oxidant passageway, each anode and each cathode material further being selectively sandwiched at spaced opposing sides between electrolyte and interconnect materials. These composite anode and cathode wall structures are further alternately stacked on one another (with the separating electrolyte or interconnect material typically being a single common layer) whereby the fuel and oxidant passageways are disposed transverse to one another.

U.S. Pat. No. 4,510,212 (Fraioli) discloses a core construction having both parallel and cross flow paths for the fuel and the oxidant gases. Each interconnect wall of the cell is formed as a sheet of inert support material having therein spaced small plugs of interconnect material, the cathode and anode materials being formed as layers on opposite sides of each sheet and being electrically contacted together by the plugs of the interconnect material. Each interconnect wall in a wavy shape is connected along spaced, generally parallel, line-like contact areas between corresponding spaced pairs of generally parallel electrolyte walls, operable to define one tier of generally parallel flow passageways for the fuel and oxidant gases. Alternate tiers are arranged to have the passageways disposed normal to one another.

SUMMARY OF THE INVENTION

This invention relates to a solid oxide fuel cell and particularly to an improved method of making a core for such a cell.

An object of this invention is to provide an improved method for making a solid oxide fuel cell core of a complicated and compact cross section having many adjacent small passageways for containing the fuel and oxidant gases.

It is another object of this invention to provide a monolithic fuel cell core fabricated according to this invention which is comprised solely and exclusively of the active anode, cathode, electrolyte and interconnect materials, and with no nonactive materials for support.

It is further object of this invention to provide a method for fabricating a solid oxide fuel cell core having oxidant passageways within the cathode, and fuel passageways within the anode defined by tube shaped voids resulting from elongated threads of organic material being rolled into the anode and cathode materials, which are then layered onto opposite sides of the electrolyte and interconnect materials and heated within a furnace, causing outgassing of the threads of organic material from the cathode and anode materials.

The present invention discloses a monolithic solid oxide fuel cell having a core, as well as attached inlet and outlet manifolds for both a fuel and an oxidant. The core includes a plurality of cathode, electrolyte, anode, and interconnect layers stacked atop one another. Passageways for fuel and oxidant within the anode and cathode layers respectively are formed by embedding organic fibers into the anode and cathode materials during a forming stage. The organic threads or fibers are then burned or outgassed from the anode and cathode layers during a binder removal heat treating cycle. The organic fibers are directionally oriented within the anode and cathode layers, allowing the anode and cathode layers themselves to be assembled for either parallel or cross flow of the fuel and oxidant passageways. Accordingly, fuel passageways are defined only by anode materials and each oxidant passageway is defined only by cathode material. The fuel cell further includes means to direct the galvanic output from the anode and cathode materials to an electrical power absorber or to a storage battery.

The method of fabricating the fuel cell core comprises the steps of individually mixing the anode, cathode, electrolyte and interconnect materials with a binder system to form a mass having a plastic consistency and then roll milling single layer tapes of each material. The organic fibers are then sandwiched between two anode or cathode tapes, and passed through the roll mill once-again. Then the four resulting single layer tapes are roll milled into a four-layer tape; i.e. cathode, electrolyte, anode, and interconnect with the cathode and anode tapes including therein the organic fibers. Thereafter, the four-layer tape is cut to the appropriate size and stacked within a plurality of similar four layer tapes. This stacked plurality of four layer tapes may then be roll milled or compressed and added to other stacked pluralities of tapes until the fuel cell of the desired size is obtained. The fuel cell is then subjected to a controlled heat up cycle in order to first remove the binder and organic fibers therefrom and then heated to a higher temperature sintering the core and fusing the ceramic particles which are in contact with one another.

DETAILED DESCRIPTION OF THE INVENTION

Figure 1:
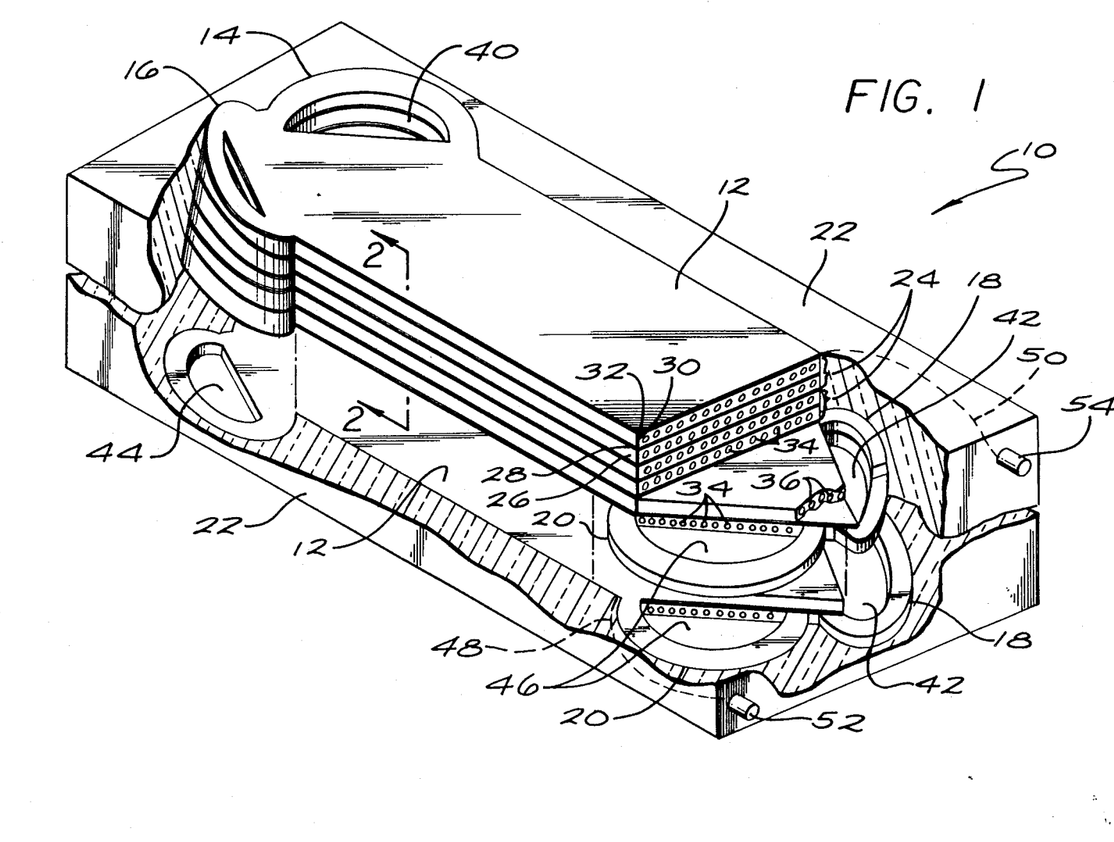
FIG. 1 is a perspective view, partially broken away for clarity, of a parallel flow fuel cell formed according to the present invention.

FIG. 1 shows a monolithic solid oxide fuel cell 10 of the present invention including a fuel cell core 12. Located at one end of the core 12 is a fuel inlet manifold 14 and an oxidant inlet manifold 16, while at the opposite end of core 12 there is a fuel outlet manifold 18 and an oxidant outlet manifold 20. The core 12 and manifolds 14, 16, 18, 20 are located within and surrounded by suitable insulation 22. Not shown are supply lines connected to suitable fuel and oxidant sources, and outlet lines leading to a receiver for the spent fuel and oxidizer to respectively provide fuel and oxidant to and from the appropriate manifolds 14, 16, 18, 20.

The fuel cell 10 is made up of a plurality of stacked individual electrochemical cells 24. Each electrochemical cell 24 includes a cathode layer 26, an electrolyte layer 28, an anode layer 30, and an interconnect layer 32. Within the cathode layer 26, there are formed a plurality of oxidant passageways 34. Similarly, within the anode layer 30, there are formed a plurality of fuel passageways 36 disposed generally parallel to one another. The oxidant passageways 34 are formed such that only cathode material defines the walls, while the fuel passageways 36 are formed such that only anode material defines the walls. Adjacent cell passageways 34 and 36 are separated by either an electrolyte layer 28 or by an interconnect layer 32. The oxidant passageways 34 and fuel passageway 36 are formed by incorporating elongated threads or fibers 38 (FIG. 4) into the cathode and anode layers 26, 30. The elongated fibers 38 are formed from an organic material which is burned out during a binder removal heating process, leaving the open passageways 34, 36.

The fuel inlet and outlet manifolds, 14 and 18 each include a fuel plenum 40, 42 to distribute to and receive fuel from the plurality of fuel passageways 36. Similarly, the oxidant inlet and outlet manifolds 16 and 20 include oxidant plenums 44, 46 to distribute to and receive oxidant from the oxidant passageways 34.

The anode, cathode, electrolyte, and interconnect materials are selected and modified to comply with the following requirements: first, the electronically conductive aspects of the cathode, anode, and interconnect; second, the ionic transport and electronic isolation aspect of the electrolyte; and third, the gas porosity property of the cathode and anode and the gas impervious property of the electrolyte and interconnect. Likewise the structural integrity, thermal expansion and contraction ratios, and chemical compositions of the composite monolithic core are designed for the specific operational parameters of temperature, pressure, gas flow rates, voltage, and current densities necessary to provide optimal efficiency.

In a preferred embodiment of the invention, the interconnect layer 32 and the electrolyte layer 28 are thin (0.002–0.005 cm) while the cathode layer 26 and anode layer 30 are perhaps the same thickness or possibly up to perhaps ten times this thickness (0.002–0.05 cm). Within the cathode layer 26 and the anode layer 30 the passageways 34, and 36 respectively, define approximately 70 to 90 percent of the cross-sectional area.

There exists a variety of possible materials which may be used as the fibers 38 to form the passageways 34, 36 within the cathode and anode layers 26, 30. Generally, the only limitations on the selection of materials would be that the material would burn or be outgassed from the fuel cell 10 during the firing process, and that the material is not reactive with the ceramic particles. These two conditions are adequately satisfied by organic based materials. Thus, the fibers 38 may be natural fibers; cotton, bast fibers, cordage fibers, or animal fibers such as wool, or they may be manufactured fibers; regenerated cellulose, cellulose diacetate, cellulose triacetate, polyamide, polyester, polyacrylic, polyvinyl, polyolefin resins, carbon or graphite fibers, or liquid crystal polymers. Alternatively, the fibers 38 can be extruded lengths of binder material such as synthetic rubber, thermoplastics or polyvinyl and extruded lengths of plasticizer material such as glycol and phthalate groups.

The monolithic core provides increased power density due to the increased active exposure areas of fuel and oxidant per the corresponding unit flow path volume, and due further to having only the active materials (the anode, cathode, electrolyte, and interconnect) within the core. The oxidant and fuel passageways 34 and 36, of the core 12 can be very small, and likewise the core walls can be thin but yet self supporting over the small distances across the defined passageways, making possible shorter current paths and reduced resistance losses, while minimizing diffusion losses by eliminating thick support tubes entirely.

In operation, gaseous fuel is conveyed from a source (not shown) to the inlet fuel plenum 40 formed within the fuel inlet manifold 14 for flow through fuel passageways 36 in the core 12 toward the outlet fuel plenum 42 formed within the fuel outlet manifold 18. Likewise, oxidant is carried from a source (not shown) to the oxidant inlet plenum 44 formed within the oxidant inlet manifold 16 for flow through the oxidant passageways 34 in the core 12 toward the oxidant outlet plenum 46 formed within the oxidant outlet manifold 20. The fuel and oxidant react electrochemically across the electrolyte layers 28 separating the anode layers 30 and cathode layers 26 in the core 12. Fuel and oxidant not consumed in the core 12, as well as byproducts, are discharged through the fuel and oxidant outlet manifolds 18, 20 and subsequently may be combusted in an appropriate combustion chamber.

It is envisioned that the fuel cell of the present invention can be used with either parallel flow or counter flow of the two working fluids. In the above description for the purpose of clarity, it was assumed that a parallel flow system is being used. However, it will be immediately apparent that reversing the inlet/outlet of either the fuel or oxidant will result in a counterflow system.

Figure 2:
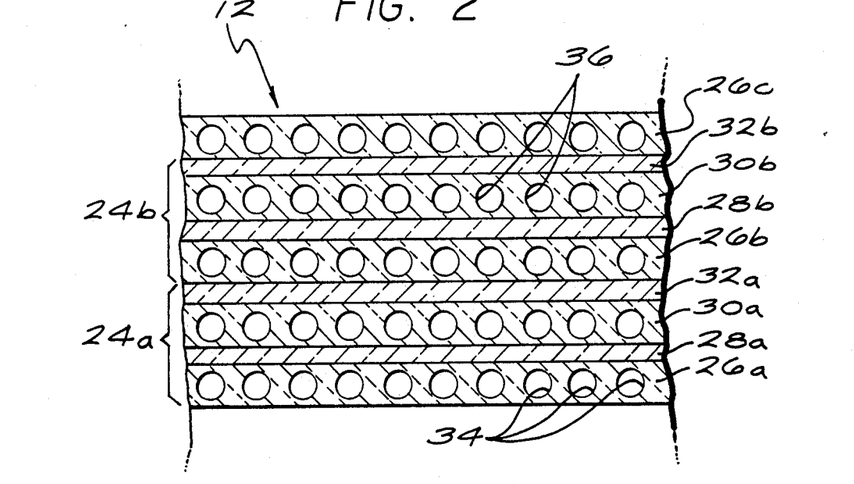
FIG. 2 is a partial, enlarged sectional view taken along line 2—2 of FIG. 1.

As can be best seen in FIG. 2, each electrolyte layer 28 is sandwiched between the cathode layer 26 and the anode layer 30. An electrochemical reaction of the fuel and oxidant being conveyed in the passageways 34 and 36, respectively, develops an electrical potential across the electrochemical cells 24. Further, for all of the electrochemical cells 24 confined between any pair of adjacent interconnect layers 32a and 32b, for example, there is a series type electrical hookup of these electrochemical cells (24a, 24b, for example).

As will be appreciated, the cathode layer 26 and anode layer 30 of the electrochemical cells 24 are porous to the degree required to allow the fuel and oxidant fluids confined on the opposite sides thereof to be transported to the electrode/electrolyte interface, while the electrolyte layer 28 and the interconnect layer 32 are impervious and serve to isolate the fuel and oxidant gases completely from one another. Additionally, the electrolyte layer 28 is electronically not conductive, so that electrons do not pass between the cathode and anode layers 26, 30 formed on opposite sides of the electrolyte. However, the electrolyte layers 28 do provide ionic conduction for oxygen ion transfer between the cathode and anode. Moreover, both the cathode and anode layers, 26 and 30, are electronically conductive. The interconnect layer 32 allows electrons to pass through it, thereby electrically connecting the anode layer 30 and cathode layer 26 of adjacent electrochemical cells 24 on opposite sides of the interconnect layer 32 together to provide a series connection of adjacent electrochemical cells 24.

In a practical fuel cell of the type shown in FIGS. 1 many serially connected electrochemical cells 24a, 24b, etc. will be provided, exceeding perhaps even two hundred. The outermost interconnect layers 26 or the series connections between interconnect layers 26 are connected electrically via conductors 48 and 50 to external terminals 52 and 54 of the fuel cell 10 to provide a cumulative electrical output at the terminals (illustrated schematically in FIG. 1). The conductors 48 and 50 may be connected to the lowermost anode layer 30 or overlying interconnect layer 32, and the uppermost cathode layer 26 or interconnect layer 32. In this manner, the overall fuel cell voltage at the external terminals 52 and 54 might be of the order of between 10 and 200 volts. The amperage provided by the fuel cell 10 will be dependent on the surface area of the core 12, with potential outputs on the order of 2.5 amps per square centimeter. Thus, a fuel cell 10 having 170 stacked cells 24 measuring 20 cm by 15 cm would produce 750. amps, at about 120 volts for an output power of 9 kilowatts. As the conductors 48, 50 will typically be formed of a high temperature conductive metal, it will be advantageous to have the conductors in a fuel environment (rather than an oxidizing environment) or to bleed a small amount of fuel over the conductors so as to minimize their oxidation.

Figure 3:
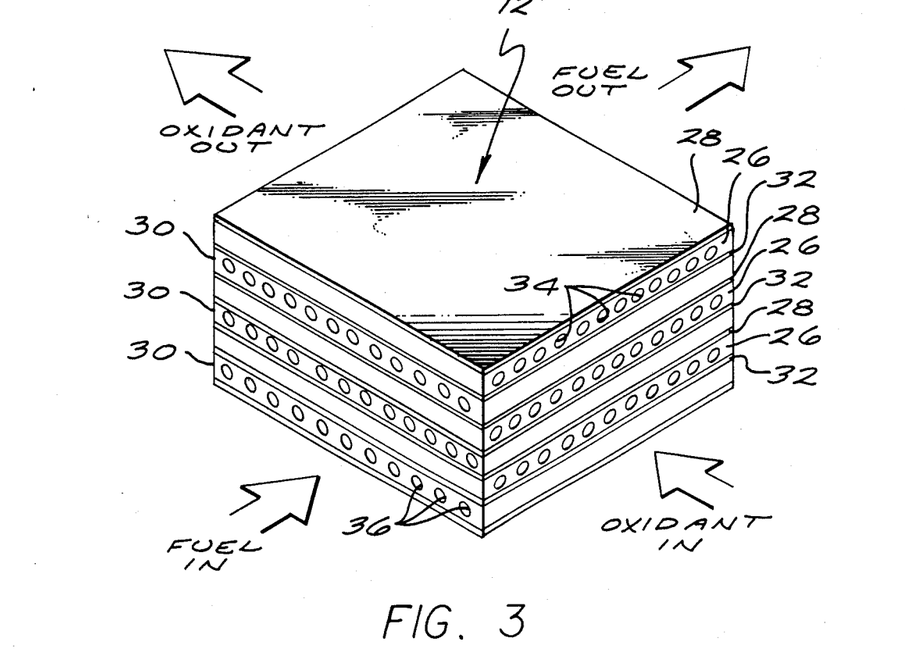
FIG. 3 is a perspective view of a portion of a core section of a cross flow fuel cell formed according to the present invention.

FIG. 3 shows a perspective view of a portion of a cross-flow fuel cell 12' having the oxidant passageways 34 arranged at right angles to the fuel passageways 36. By this arrangement, cubes of fuel cell cores can be assembled, cut or trimmed to near net shape while in the green state, and have the manifold sections attached after the core 12' is sintered.

PREFERRED METHOD OF FABRICATING THE FUEL CELL

Figure 4:
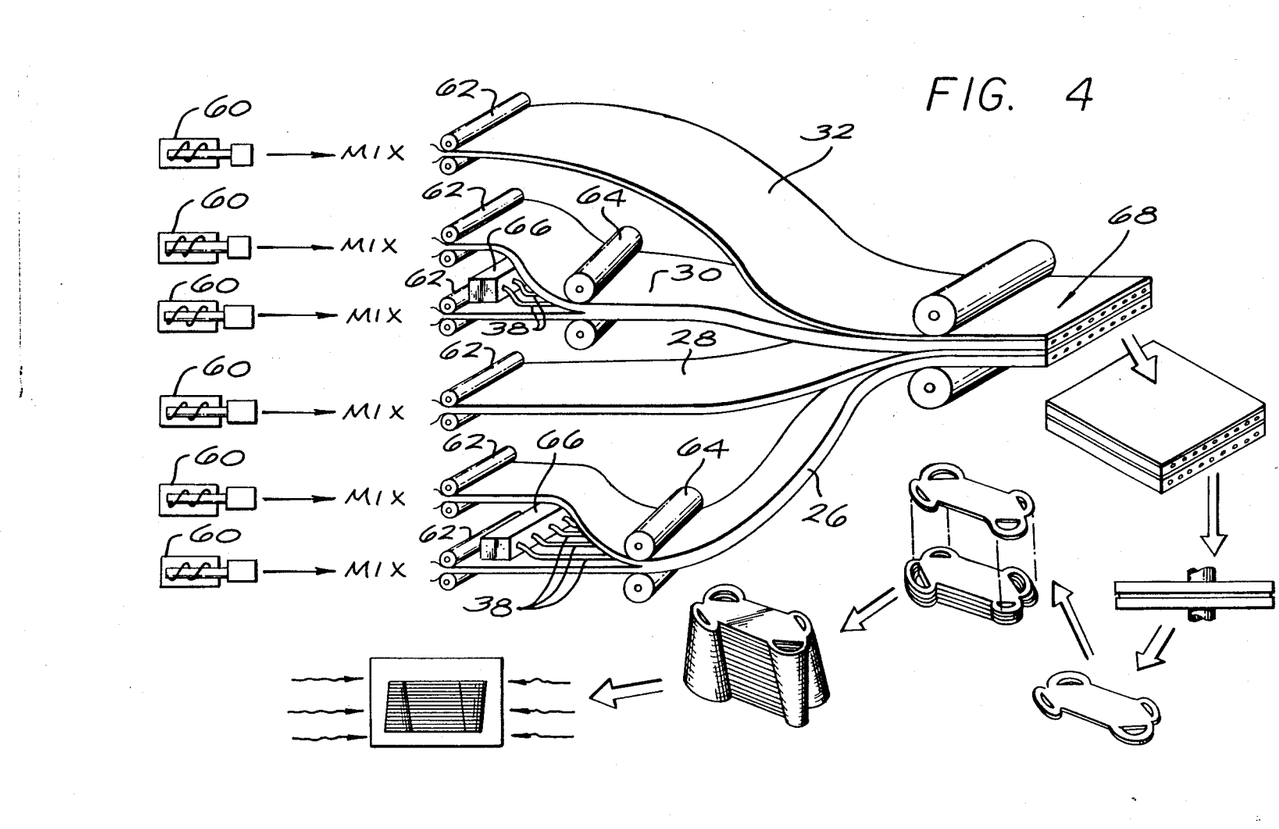
FIG. 4 is a diagrammatic flow chart of the steps required to form a fuel cell of the present invention.

Shown in FIG. 4 is a schematic diagram of the process to manufacture a fuel cell of the present invention. Powders for each of the materials—strontium-doped lanthanum manganite for the cathode, yttria-stabilized zirconia for the electrolyte, magnesium-doped lanthanum chromite for the interconnect and a cermet of cobalt or nickel metal with, stabilized zirconia for the anode—are first prepared so that the particle size ranges from 0.1 microns to 10 microns. The powder is then mixed with the desired binder and plasticizer in a high intensity mixer 60. For example, to form the electrolyte material, yttria-stabilized zirconia is mixed with binder and plasticizer in approximate weight percentages. The binder and plasticizer make up approximately 10–40%, by weight, of the total mix and preferably approximately 19%. The amounts of binder and plasticizer being approximately equal. Porosity may be controlled by using larger sized particles, by the use of the higher percentage of binder, or by the addition of pore formers.

Typically, the binder used can be selected from the group comprising: synthetic rubber, thermoplastics, polyvinyl alcohol or polymer systems which thermally decompose without cross-linking. The plasticizer chosen is one that allows low temperature forming of the pliable and elastic binder system, e.g. glycol and phthalate groups.

The powder, binder and plasticizer are combined in a high intensity mixer at room temperature. The mixing disperses the powder particles and coats each particle with binder and plasticizer. The mixing action also raises the temperature through friction to 150° C. and softens the binder. Typically, the time for mixing can be 0.5 to 10 minutes with 2 minutes generally being sufficient.

The mixed material is removed from the mixer and rolled, milled, or calendered into a tape, preferably immediately after mixing to retain the heat generated by the mixing. As shown, the rolling step is carried out by a roll mill 62. Each roller of the roll mill 62 is generally heated to from 10–150° C. depending on the batch material to assist in the rolling operation. Each material (cathode, electrolyte, anode and interconnect) is roll-milled into a tape 26, 28, 30 and 32 of the desired thickness. It should be noted that the numerals 26, 28, 30 and 32 designate the material as well as a tape or layer formed of that material.

Next, the fibers 38 are incorporated into the cathode material 26 and anode material 30 by sandwiching the fibers 38 between two layers of the material and rolling once again within another roll mill 64 as shown in FIG. 4. The fibers 38 are dispensed onto one of the layers by a dispenser 66. The dispenser 66 may be an extrusion device or may simply include a number of spools carrying preformed fibers. Alternatively, the fibers 38 may be directly incorporated during the initial rolling of the cathode 26 and anode 30 tapes.

Thereafter, a multilayer tape 68, which will upon firing, form one cell 24, is roll-milled from the original tapes, i.e. 26, 28, 30, and 32. During this step each tape is pressure bonded to the adjacent tape(s). It is important that no voids are formed between the tape 68 layers during this rolling step. The resulting multilayer tape may be further calendered if required to reduce its thickness. Desired thicknesses for the multilayer tapes 68 will be on the order of from 0.008 cm to 0.1 cm, and preferably about 0.025 cm. Furthermore, it is envisioned that a plurality of the multilayer tapes 68 can be formed simultaneously in a single rolling step. The multilayered tapes 68 are then rough cut into a desired shape.

The multilayer tapes 68 are then cut to final dimensions and a plurality of the multilayer tapes are stacked to form a stacked array defining the fuel cell core 12. For stacking, the green state tapes may be solution treated with any solvent (i.e. alcohol) which will dissolve the binder and assist in bonding the multilayer tapes. Binder extraction as well as extraction of the fibers 38 is done in a non-reactive, air or vacuum furnace by uniformly heating the core slowly, increasing the temperature at a rate of from about 0.1° C. to 1° C. per minute to from approximately 200° C. to 500° C. depending on the binder used, so that the binder and fibers 38 change into a gaseous phase and are outgassed from the core 12. The heat up rate is important in that it must be slow enough not to cause blistering or the formation of gas pockets between or within the multilayered tapes 68. Binder extraction removes all but a small amount of residues (approximately 1% by weight of the total binder) and results in approximately 5%-10% shrinkage. After the binder has been removed the core 14 can either be allowed to air cool or it may proceed directly to sintering within the furnace.

Alternatively, if may be desirable to have the binder removal process completed before the fibers 38 are outgassed. This can be accomplished by choosing a fiber material having a higher outgassing temperature then that of the binder. It has been found that during the binder removal process the multilayer tapes 68 can become mechanically weak and may be subject to collapsing into the passageways 34, 36. However, once a majority of the binder has been removed, the ceramic particles have started to fuse together and the core 12 has attained a certain degree of structural rigidity. Thus, by tailoring the fibers to outgas at a higher temperature than the binder material, the multilayer tapes are always supported, and no collapsing into the oxidant and fuel passageways will occured.

Sintering is a process which results in a final densification of the core materials. During sintering the furnace is heated at a rate of from 0.3° C. to 3° C. per minute to approximately 1400° C. causing the ceramic particles which are in proximity to one another to bond together to form the rigid fuel cell core 12. The interconnect and electrolyte materials undergo a densification to 94-99% of theoretical density, thereby forming a gas tight barrier. The anode and cathode materials resulting have a 20% to 50% porosity after the sintering step.

Various modifications to the desired and described apparatus and method will be apparent to those skilled in the art. Accordingly, the foregoing detailed description of the preferred embodiment and apparatus should be considered exemplary in nature, and not as limiting to the scope and spirit of the invention as set forth in the appended claims.

We claim:

1. A method of making a solid oxide ceramic fuel cell comprising the steps of:
   mixing powders of cathode, electrolyte, anode and interconnect ceramics each separately with a binder and a plasticizer to form a batch of each of said materials;
   shaping said cathode batch into a cathode tape layer incorporating a plurality of oriented organic fibers therein;
   shaping said electrolyte batch into an electrolyte tape layer;
   shaping said anode batch into an anode tape layer incorporating a plurality of oriented organic fibers therein;
   shaping said interconnect batch into an interconnect tape layer said shaping of said batch materials into said tapes performed by a process selected from the group including rolling, milling, and calendering;
   assembling said cathode tape layer, electrolyte tape layer, anode tape layer, and interconnect tape layer together to form a multilayer tape;
   cutting a portion of said multilayer tape to a desired shape;
   processing said multilayered tape portion to remove said organic fibers from said cathode tape layer and said anode tape layer leaving a plurality of passageways within said cathode and said anode; and
   sintering said multilayer tape portion to form a fuel cell.

2. The method of claim 1 further comprising the step of:
   stacking a plurality of said multilayer tapes to form a stacked array prior to said processing step.

3. The method of claim 2 wherein said processing step further comprises:
   heating said stacked array within a furnace to remove said binder, said plasticizer and said organic fibers from said multilayered tapes.

4. The method of claim 1 wherein said assembling step further comprises:
   roll milling a plurality of said multilayer tapes simultaneously to pressure bond each layer to any adjacent layer and each multilayer tape to any adjacent multilayer tape to form an array of multilayer tapes.

5. The process of claim 1 wherein said method further comprises:
   first preparing powders of strontium-doped lanthanum manganite for said cathode, yttria-stabilized zirconia for said electrolyte, magnesium-doped lanthanum chromite for said interconnect and a cermet of metal with stabilized zirconia for said anode to have a particle size in the range of from 0.1 micron to 10 microns prior to said mixing step.

6. The process of claim 5 wherein said preparing further comprises:
   selecting said binder from the group including synthetic rubber, thermoplastics, polyvinyl, and polymer systems; and
   selecting said plasticizer from the group including glycol and phthalate groups.

7. The process of claim 1, wherein said binder and said plasticizer make up approximately from 10 percent to 40 percent by weight of said batches of materials.

8. The method of claim 1 wherein said steps of shaping said cathode layer and shaping said anode layer comprises:
   roll milling two tapes each of said cathode and said anode materials;
   sandwiching said plurality of oriented organic fibers between said two tapes of each of said materials, and
   roll milling said tapes with said sandwiched fibers into a single tape including said fibers.

9. The method of claim 1 wherein said organic fibers are selected from the group including natural fibers, manufactured fibers, extruded lengths of binder, and extruded lengths of plasticizer.

10. The method of claim 9 wherein said organic fibers are natural fibers selected from the group including: cotton, bast fibers, cordage fibers, and animal fibers.

11. The method of claim 9 wherein said organic fibers are manufactured fibers selected from the group including: regenerated cellulose, cellulose diacetate, cellulose triacetate, polyamide, polyester, polyacrylic, polyvinyl, polyolefin resins, carbon, graphite fibers, and liquid crystal polymers.

12. The method of claim 1 wherein said assembling step comprises:
   roll milling said cathode tape layer, said electrolyte tape layer, said anode tape layer and said interconnect tape layer together to pressure bond each of said tape layers to the adjacent tape layer(s) and to form said multilayer tape having a thickness of from about 0.008 centimeters to 0.1 centimeters.

13. A method of making a solid oxide ceramic fuel cell comprising the steps of:
   assembling a plurality of multilayered tapes in a green state into a stacked array, said multilayered tapes each including tapes of cathode, electrolyte, anode, and interconnect ceramic materials mixed with a binder and a plasticizer, said anode and said cathode tapes also including a plurality of oriented fibers therein, said stacked array being substantially free of voids or open spaces;
   heating said stacked array within a furnace the temperature of which is increased at a pressurized rate up to about 500 degrees centigrade to remove both said binder and said plasticizer, and also to remove said oriented fibers from said cathode tape and said anode tape thereby to form a plurality of passageways there within; and
   sintering said processed stacked array to form a monolithic fuel cell.

14. The method of claim 13 wherein said sintering step densifies said electrolyte and said interconnect to a density of from 95 to 99 percent of theoretical.

15. The method of claim 13 wherein each of said multilayered tapes within said stacked array is first formed by the process steps of:
   forming a thin cathode layer and incorporating a plurality of oriented fibers therein;
   forming a thin electrolyte layer;
   forming a thin anode layer and incorporating a plurality of oriented fibers therein;
   forming a thin interconnect layer;
   roll milling said layers together to pressure bond each of said layers to the adjacent layer(s) to form said multilayer tape having a thickness of from about 0.008 centimeters to 0.1 centimeters.

16. The method of claim 13 wherein said oriented fibers are selected from the group including natural fibers, manufactured organic fibers, and extruded lengths of binder and plasticizer.

17. A method of making a monolithic solid oxide fuel cell comprising the steps of:
   preparing powders of strontium-doped lanthanum manganite for a cathode, yttria-stabilized zirconia for an electrolyte, magnesium-doped lanthanum chromite for an interconnect and a cermet of metal with stabilized zirconia for an anode to have a particle size in the range of from 0.1 micron to 10 microns;
   mixing said powders of cathode, electrolyte, anode and interconnect each separately with a binder and a plasticizer to form a batch of each of said materials;
   forming a cathode layer from said batch of cathode material and incorporating a plurality of oriented fibers therein;
   forming an electrolyte layer from said batch of electrolyte material;
   forming an anode layer from said batch of anode material and incorporating a plurality of oriented fibers therein;
   forming an interconnect layer from said batch of interconnect material;
   interbounding said cathode layer, said electrolyte layer, said anode layer and said interconnect layer together to form a multilayer tape having a thickness of from about 0.008 centimeters to 0.1 centimeters;
   forming a portion of said multilayer tape to a desired shape;
   stacking a plurality of said multilayer tape portions to form a stacked array;
   heating said stacked array within a furnace the temperature of which is increased at a preselected rate up to about 500 degrees centigrade to remove both said binder and said plasticizer, and also to remove said oriented fibers from said cathode tape and said anode tape thereby to form a plurality of passageways therewithin; and
   sintering said stacked array to densify said cathode, electrolyte, anode, and interconnect and form the monolithic solid oxide fuel cell.

18. A multilayer tape for use in the construction of a solid oxide fuel cell comprising:
   a cathode layer;
   an electrolyte layer;
   an anode layer;
   an interconnect layer, said cathode, electrolyte, anode, and interconnect layers each including respective ceramic powders, respective binders, and respective plasticizers; and a plurality of oriented organic fibers within said cathode layer and said anode layer, said fibers extending a substantial length within said multilayer tape.

19. The multilayer tape of claim 18 wherein said binders are selected from the group including synthetic rubber, thermoplastics, polyvinyl, and polymer systems, and said plasticizer is selected from the group including glycol and phthalate groups.

20. The multilayer tape of claim 18 wherein said oriented organic fibers are selected from the group including natural fibers, manufactured fibers, extruded lengths of binder, and extruded lengths of plasticizer.

21. The multilayer tape of claim 20 wherein said multilayer tape has a thickness of from 0.008 centimeters to 0.1 centimeters.

22. A monolithic green state ceramic assembly comprising:
   a core having a plurality of multilayer cells each cell having a cathode layer, an electrolyte layer, an anode layer and an interconnect layer, said plurality of multilayer cells stacked together to form a stacked array, said stacked array being substantially free of voids and open spaces;
   a first pair of manifolds located at opposite ends of said core;
   a second pair of manifolds located at opposite ends of said core;
   a first plurality of oriented organic fibers disposed within said anode layers or said cells, said first fibers extending from one of said pair of first manifolds through said core to the other of said first manifolds.

23. The ceramic assembly according to claim 22 wherein said ceramic within said layers for said cells comprises strontium-doped lanthanum manganite for said cathode, yttria-stabilized zirconia for said electrolyte, magnesium-or strontium-doped lanthanum chromite for said interconnect and a cermet of cobalt or nickel metal with stabilized zirconia for said anode prepared so that the ceramic particle size ranges from 0.1 microns to 10 microns.

24. The ceramic assembly of claim 23 wherein said layers for said cells further comprise a binder and a plasticizer combined with said ceramic particles, said binder selected from the group including: synthetic rubber, thermoplastics, polyvinyl alcohol or polymer systems which thermally decompose without crosslinking, and said plasticizer selected from the group including glycol and phthalates.

* * * * *